Jan. 12, 1965 H. BLÖCHLINGER ETAL 3,165,709

FREQUENCY SELECTION CIRCUIT, PARTICULARLY FOR CALL RECEIVERS

Filed Dec. 13, 1960

Inventors
Hans Blochlinger
Rudolf Kauffungen
By Stevens Davis Miller & Mosher
Attorneys United States Patent Office 3,165,709
Patented Jan. 12, 1965

3,165,709
FREQUENCY SELECTION CIRCUIT, PARTICULARLY FOR CALL RECEIVERS

Hans Blöchlinger and Rudolf Kauffungen, Solothurn, Switzerland, assignors to Autophon Aktiengesellschaft, Solothurn, Switzerland Filed Dec. 13, 1960, Ser. No. 75,571
Claims priority, application Switzerland, Dec. 24, 1959, 82,319/59
10 Claims. (Cl. 331—113)

In systems having a large number of radio call-receivers which respond individually to a high frequency signal which is sent out by a central office modulated with an individual series of low frequency signals, a large number of low frequencies which are close to each other must be used for the modulation frequencies. In call receivers in which these frequencies are to be distinguished from each other, the problem of low frequency selection then arises. In this connection, the frequency response characteristic of the selection means used should, if possible, be of square shape so that small deviations in frequency between the transmitter and receiver do not result in detrimental consequences. Band filters constructed of capacitors and inductors can fulfill the requirements but are relatively heavy and cumbersome for low frequencies.

The present invention is intended to make it possible, with simple means, to filter out the frequencies in a manner which differs fundamentally from the manner previously known. It relates to a frequency selection circuit, particularly for call receivers, adapted to produce an output signal as a function of the reception of an input signal which lies within a narrow frequency range. This frequency selection circuit is characterized by first means for converting the input signal into a first square wave signal and by second means which produces a second square wave signal and is suitable for phase-fixed synchronization with an external signal which differs relatively little from its natural frequency. This frequency selection circuit is furthermore characterized by third means which feeds a signal derived from the first square wave signal as a synchronizing signal to the second means. Another characteristic of this frequency selection circuit is the use of fourth means which rectifies the first and second square wave signals and produces an output signal by the addition of these two rectified signals to a fixed bias voltage which is opposite in polarity to said rectified signals.

One embodiment by way of example of such a frequency selection circuit will be described herein. In the specific embodiment presently to be described the second means comprises an astable multivibrator.

Figure 1:
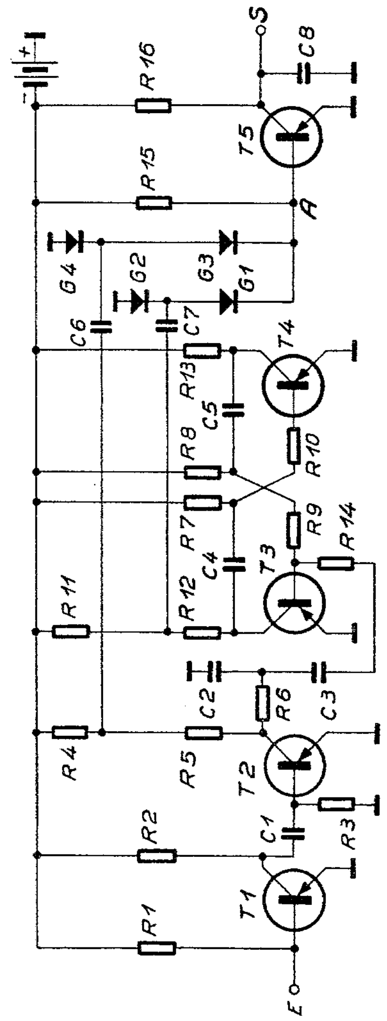

FIGURE 1 is a circuit diagram of a frequency selection circuit according to the present invention, wherein E represents the signal input terminal and A represents an output terminal.

Figures 2, 3, 4:
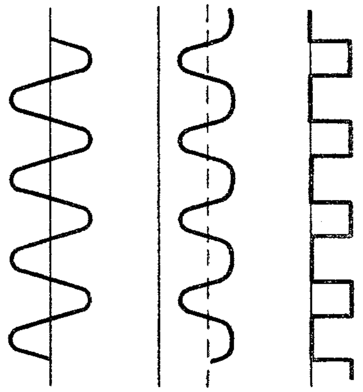

FIGURES 2 to 4 are waveforms illustrating the manner of operation of the first means, comprising primarily the transistors T1 and T2, in the circuit of FIGURE 1. If a sinusoidal signal wave in accordance with FIGURE 2 is applied to the input terminal E, there is produced at the collector of the transistor T1 the voltage wave shown in FIGURE 3, and the voltage wave shown in FIGURE 4 is produced at the collector of the transistor T2.

Figures 5, 6, 7, 8:
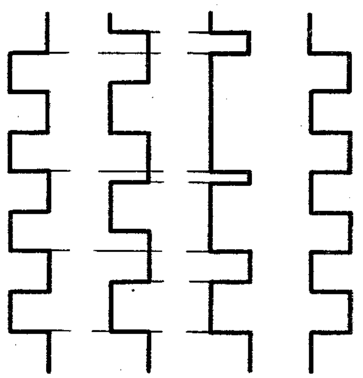

FIGURES 5 to 8 are waveforms illustrating the manner of operation of the fourth means, comprising primarily the rectifiers G1, G3 and the resistor R15. In this connection, FIGURE 5 illustrates by way of example the waveform of a first square wave signal, the frequency of which deviates from that of the signal wave shown in FIGURE 6. FIGURE 7 shows the waveform of the voltage wave at the output terminal A of the circuit of FIGURE 1 when signals in accordance with FIGURES 5 and 6 are fed to the fourth means. FIGURE 8 shows the waveform of a second square signal wave which is produced when the multivibrator is synchronized with the signal shown in FIGURE 5.

The sinusoidal input signal of the frequency to be evaluated in accordance with FIGURE 2, passes from the input terminal E to the base of the transistor T1. This base is negatively biased via the resistor R1. This bias, in contradistinction to a customary amplifier connection, is selected smaller than the amplitude of the input signal so that the transistor T1 acts as a limiter stage and produces across its collector resistor R2 the distorted voltage wave shown in FIGURE 3. This signal is then fed via the capacitor C1 to the base of the transistor T2. The base of this transistor is grounded via the resistor R3 so that the transistor T2 cannot be modulated with the positive half wave of the signal shown in FIGURE 3. The amplification ratios with respect to the input signal are furthermore so selected that over-modulation occurs with the negative half wave. The transistor T2 thus also operates as a limiter stage. The result of these limitations is a square wave signal as shown in FIGURE 4. Due to the distortions produced by the transistor T1, the positively directed signal components (FIGURE 4) are longer than the negatively directed ones. The ratio can be controlled within certain limits by varying the value of the resistor R1 and thus the bias of the base T1. The limiter system above described, which converts the input signal into a suitable square wave signal produced via the resistors R4 and R5, is hereinafter termed, in its entirety, the "first means." The longer components of this square wave signal are further used as positive pulses.

The circuit consisting of the transistors T3 and T4, the resistors R7 to R13 and the capacitors C4 and C5 represents an astable multivibrator, the operation of which is generally known and therefore does not need to be described in detail herein. The resistors R9 and R10 serve in a known manner to make the waveform of the current flow in the collectors square. The resistors R7 and R8 and the capacitors C4 and C5 determine the frequency.

This multivibrator, which is referred to in the claims as "second means," can be synchronized in locked phase relationship with a signal of a frequency lying in the vicinity of its natural frequency. It oscillates in its condition of rest at its natural frequency and can be synchronized from the limiter stage T2 via the resistor R6, the capacitor C3 and the resistor R14, which are designated as a whole in the claims as "third means." If there now arrives via the input terminal E and the first means a signal of a frequency which differs greatly from the natural frequency of the multivibrator, then the frequency of the multivibrator will not be influenced, or will only be influenced slightly by this signal. If the frequency of the incoming signal, on the other hand, agrees with the natural frequency or differs only slightly from it, the multivibrator will be synchronized with this frequency, i.e., it will then operate in locked-phase relationship with the signal applied to the input terminal E. The limits of the range within which the frequency of an input signal must lie in order that synchronization takes place are very sharply drawn. The capacitor C2 effects a rounding of the synchronizing pulses, as a result of which the possibility of synchronization with frequencies lying below the natural frequency of the multivibrator is improved, while the possibility of synchronization with frequencies lying above the natural frequency is somewhat reduced. By suitable selection of the value of this capacitor C2, it is possible to predetermine the width of said range, as required, and to make it such that the natural frequency of the multivibrator is approximately in the center of the range, which is very advantageous for tuning and maintenance.

A square wave signal which is derived from the collector current of the transistor T3, and hereinafter termed the "second square wave signal," is removed from between the resistors R11 and R12 and fed via the capacitor C7 to the fourth circuit means, which will be described below. The first square wave signal which was derived from the input signal and tapped off between the resistors R4 and R5 is also fed via the capacitor C6 to said fourth means. The said fourth means comprises the four rectifiers G1 to G4 and the resistor R15. Without taking into consideration the pulses entering via the capacitors C6 and C7, a rest current flows through the rectifiers G2 and G1, and parallel thereto through G4 and G3, and furthermore through the resistor R15, so that the output point A of the circuit, and thus the base of the transistor T5, receives a small negative bias. To this bias positive pulses are added via the rectifiers G1 and G3 respectively, so that the said base becomes positive when a pulse arrives either through the capacitor C7 and rectifier G1 or through the capacitor C6 and the rectifier G3, or through both these branches together. As a result of the blocking action of the rectifiers, these pulses do not affect each other. The reference potential of the pulses is held at ground level by the rectifiers G2 and G4. This mixer means (fourth means) is known from the art of logical circuits as an "OR-gate" or as a "OR-circuit." The output signal of this logical circuit is amplified in the transistor T5. In the absence of the arrival of pulses, a current also flows parallel to the rectifiers G1–G4 via the emitter and the base of the transistor T5. This transistor is therefore conductive in this condition so that the capacitor C8 is practically short-circuited and the point S is practically at ground potential. Upon each rise of the potential at the base of transistor T5, caused by an incoming positive pulse, the transistor T5 is blocked, whereby the short circuit across the capacitor C8 disappears and this capacitor can become charged via the resistor R16. By selecting a large capacitor C8, the charge time constant of this circuit is made considerably greater than the duration of the pulse, whereby integration is obtained. The voltage across the capacitor C8 therefore does not increase considerably when relatively short pulses, interrupted by pauses, arrived at the base of transistor T5. If this base, however, assumes a positive potential for a relatively long time, the voltage across the capacitor G8 increases and the point S becomes negative.

The overall action of the gate circuit can be noted from FIGURES 5 to 8. FIGURE 5 shows the voltage variation across the resistor R4, i.e., the potential waveform of the first square wave signal which arrives at the gate circuit via the capacitor C6. Since we are concerned here with a theoretical analysis, the pulses and the pauses have been assumed to be of equal length in FIGURE 5. FIGURE 6 shows, assuming the unsynchronized condition of the multi-vibrator, the waveform of the second square wave signal, i.e., of the pulses produced by the multivibrator which are fed to the gate circuit via the capacitor C7. In the case shown, their frequency is lower than that of the first square wave signal. FIGURE 7 shows the resultant of the superimposition of the waveforms of FIGURES 5 and 6, and shows the voltage waveform at the base of the transistor T5, i.e., at the output terminal A of the OR-gate circuit, provided that the first and the second square wave signals in accordance with FIGURES 5 and 6 are fed to said circuit. This train of pulses (FIGURE 7) contains relatively long pulses, but the charge time constant of the circuit C8, R16 is so selected that no essential change in potential takes place at the point S in this case. During the short pauses between the pulses, the capacitor can each time discharge again.

If the multivibrator is synchronized by the first square wave signal in accordance with FIGURE 5, it produces the train of pulses shown in FIGURE 8. This train of pulses, i.e., the second square wave signal, is of exactly opposite phase to the synchronizing signal. This precise phase opposition, i.e., a phase shift of 180°, is very important and is obtained by feeding the synchronizing signal to the transistor T3 at its base, while the signal coming from the multivibrator and fed to the gate circuit is taken from the collector circuit of the transistor T3. In other words, the feeding and removal take place at two points at which the voltages present are displaced 180° in phase. The superimposition of the two trains of pulses of FIGURES 5 and 8 in the gate circuit produces a continuous positive voltage at the base of the transistor T5 so that this transistor is continuously blocked, whereupon the voltage across the capacitor C8 rises. This rise in voltage corresponds to a negative pulse, which is relatively flat, at the terminal point S, from which this pulse is transferred and utilized in a manner which is not related with the invention.

As can be noted from the above, it is important for the occurrence of this pulse that the first and second square wave signals overlap at least approximately without gap. Due to the lengthening of the pulse time as compared with the pause time in the first square wave signal, obtained by the measures described above, such an overlapping will be obtained even if the phase relation of the signals is not entirely correct.

Summarizing, it can be stated that the output point A becomes continuously positive, and thus a relatively long pulse is produced at the point S, only if there is applied to the input terminal E an alternating current signal having a frequency which is within a well-defined frequency band extending above and below the natural frequency of the multivibrator. The limits between the input frequencies which produce said relatively long pulse and those which do not produce such a pulse are very sharply drawn, and the amplitude of the pulse is independent of the position of the frequency producing same within the frequency band which is responsible for the production thereof. The entire frequency selection circuit thus has a practically square response characteristic and accordingly combines the advantages of high selectively with a substantial selection band width, which prevents detrimental effects from small deviations from the desired frequency both on the transmitter side and in the selection circuit.

The precision of the selection circuit is dependent primarily on the accuracy of the frequency of the multivibrator. A high precision in frequency can be obtained by using silicon transistors, by using negative temperature coefficient resistors connected at suitable points, and by suitable selection of the temperature coefficients of the capacitors and of the resistors. Since such measures are known per se and are not directly related to the invention, they will not be described herein.

In the above described example of the invention p–n–p transistors were used without exception. It is obvious that by reversing all polarities, n–p–n transistors can also be used without anything being thereby changed in the mode of operation and without the inventive concept being affected thereby.

While a specific embodiment of a frequency selection circuit has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A frequency selection circuit of the character described comprising first means to receive an alternating current input signal to convert such input signal into a first square wave, second means comprising an oscillator producing a second square wave and adapted to be synchronized in phase-locked relation by an external periodic signal approximately of the same frequency as the natural frequency of the oscillator, third means coupling said first means to said second means so as to synchronize said oscillator, and fourth means to rectify and superimpose said first and second square waves and to derive therefrom a resultant output signal of at least approximately continuous duration when the frequency of the external signal is so near to the natural frequency of said oscillator that said oscillator is synchronized by the external signal.

2. A frequency selection circuit of the character described comprising first means adapted to receive an alternating current input signal to convert such input signal into a first square wave, second means comprising an oscillator producing a second square wave and adapted to be synchronized in phase-locked relation by an external periodic signal approximately of the same frequency as the natural frequency of the oscillator, third means coupling said first means to said second means so as to synchronize said oscillator, fourth means to rectify and superimpose said first and second square waves and to derive therefrom a resultant output signal of at least approximately continuous duration when the frequency of the external signal is so near to the natural frequency of said oscillator that said oscillator is synchronized by the external signal, an output circuit including a capacitor, means to apply said output signal to said output circuit, and means to charge said capacitor to a substantially steady voltage when the uniterrupted duration of the output signal exceeds a predetermined value.

3. A frequency selection circuit of the character described comprising first means to receive an alternating current signal to convert such signal into a first square wave, second means comprising an oscillator producing a second square wave and adapted to be synchronized in phase-locked relation by an external signal approximately of the same frequency as the natural frequency of the oscillator and is within a predetermined relatively narrow range containing said natural frequency, third means coupling said first means to said second means so as to synchronize said oscillator with said external signal, fourth means to rectify and superimpose said first and second square waves and to derive therefrom a resultant output signal at least approximately continuous duration when the frequency of the external signal is so near to the natural frequency of the oscillator that said oscillator is synchronized by the external signal, an integrating circuit, means to apply said output signal to said integrating circuit, and means to derive a substantially steady voltage at the output of said integrating circuit when the uninterrupted duration of said output signal exceeds a predetermined value.

4. A frequency selection circuit of the character described comprising an input stage adapted to receive an alternating current input signal, limiter means in said input stage to convert such input signal into a first square wave, a square wave oscillator producing a second square wave and adapted to be synchronized in phase-locked relation by an external periodic signal whose frequency is within a predetermined narrow range containing the natural frequency of the oscillator, means applying said first square wave to said oscillator so as to synchronize said oscillator, mixer means, and means to apply said first and second square waves to said mixer means, said mixer means deriving therefrom an output signal of at least approximately continuous duration when the oscillator is synchronized by said first square wave.

5. A frequency selection circuit of the character described comprising an input stage adapted to receive an alternating current input signal, limiter means in said input stage to convert such input signal into a first square wave, a square wave oscillator producing a second square wave and adapted to be synchronized in phase-locked relation by an external periodic signal whose frequency is within a predetermined narrow range containing the natural frequency of the oscillator, means applying said first square wave to said oscillator so as to synchronize said oscillator, mixer means, means to apply said first and second square waves to said mixer means, said mixer means deriving therefrom an output signal of at least approximately continuous duration when the oscillator is synchronized by said first square wave, an integrating circuit, means to apply said output signal to said integrating circuit, and means to derive a substantially steady voltage at the output of said integrating circuit when the uninterrupted duration of said output signal exceeds a predetermined value.

6. A frequency selection circuit of the character described comprising an input stage adapted to receive an alternating current input signal, limiter means in said input stage to convert such input signal into a first square wave, a square wave multivibrator producing a second square wave and adapted to be synchronized in phase-locked relation by an external periodic signal whose frequency is within a predetermined narrow range containing the natural frequency of the multivibrator, means applying said first square wave to said multivibrator so as to synchronize said multivibrator, mixer means, means to apply said first and second square waves to said mixer means, said mixer means deriving therefrom an output signal of at least approximately continuous duration when the multivibrator is synchronized by said first square wave, an output circuit including a capacitor, means to apply said output signal to said output circuit, means to charge said capacitor, and means to prevent said capacitor from assuming a steady charge unless the multivibrator is synchronized by said first square wave.

7. The structure of claim 4, and wherein said limiter means comprises two successively coupled limiter stages.

8. The structure of claim 7, and wherein the first limiter stage is biased so that its output is asymmetrical and so that the first square wave comprises pulses which are longer than the intervals therebetween.

9. The structure of claim 4, and wherein said oscillator comprises a square wave multivibator and wherein the first square wave is applied to the multivibrator at a point relative to the output point thereof such that the second square wave is 180° out of phase with respect to the first square wave when the multivibrator is synchronized.

10. The structure of claim 5, and wherein said mixer means comprises a mixer gate circuit having respective input branches receiving the first and second square waves and including means to rectify and superimpose same, whereby to produce said resultant output signal.

References Cited in the file of this patent

UNITED STATES PATENTS 3,010,073 Melas ---------------- Nov. 21, 1961

FOREIGN PATENTS 1,244,757 France ---------------- Sept. 19, 1960